United States Patent [19]

Mosier

[11] Patent Number: 4,470,918

[45] Date of Patent: Sep. 11, 1984

[54] HYDRAULIC FLUID COMPOSITIONS

[75] Inventor: Benjamin Mosier, Houston, Tex.

[73] Assignee: Global Marine, Inc., Los Angeles, Calif.

[21] Appl. No.: 486,345

[22] Filed: Apr. 19, 1983

Related U.S. Application Data

[63] Continuation of Ser. No. 365,394, Apr. 5, 1982, abandoned.

[51] Int. Cl.³ .......................... C09K 7/02; C10M 3/26
[52] U.S. Cl. .................................... 252/77; 252/49.3; 252/51.5 A; 252/79; 252/106; 564/291
[58] Field of Search ................... 252/49.3, 51.5 A, 77, 252/79, 106; 564/291

[56] References Cited

U.S. PATENT DOCUMENTS 2,097,864  11/1937  Platz et al. ..................... 252/546
2,584,057   1/1952  Soule et al. ..................... 252/106
2,811,549  10/1957  Aelony .......................... 252/546
2,953,526   9/1960  Bergman et al. ................ 252/546

FOREIGN PATENT DOCUMENTS 55-118998  9/1980  Japan ............................ 252/77

Primary Examiner—John E. Kittle
Assistant Examiner—Robert A. Wax
Attorney, Agent, or Firm—Christie, Parker & Hale

[57] ABSTRACT

A hydraulic fluid comprising at least one polyethoxylated fatty amino carboxylate zwitterion. Preferred compositions contain polyethoxylated fatty amines and fatty amino carboxylates. Fatty acid quaternary ammonium salt-based biocides, polyethoxylated fatty amino corrosion inhibitors, polyhydroxy alcohol freezing-point depressants and dispersants may be included. Concentrates of the compositions and their method of preparation are disclosed.

43 Claims, No Drawings

HYDRAULIC FLUID COMPOSITIONS

CROSS REFERENCES TO RELATED APPLICATION

This application is a continuation application of Ser. No. 365,394, filed Apr. 5, 1982, now abandoned.

FIELD OF THE INVENTION

This invention relates to chemical compositions for use as a hydraulic fluid and in particular a hydraulic fluid for use in blowout preventers used in oil drilling rigs.

BACKGROUND OF THE INVENTION

Hydraulic fluids are low viscosity fluids used for the transmission of useful power by the flow of the fluid under pressure from a power source to a load. A liquid hydraulic fluid generally transmits power by virtue of its displacement under a state of stress.

An example of a hydraulic fluid encountering relatively severe conditions is the hydraulic fluids used in a blowout preventer which is used to control the wellhead pressure of an oil well that is being drilled. Even more severe conditions are encountered in blowout preventers used in marine environments such as in offshore oil drilling rigs. A blowout preventer is a hydraulic device for virtually instantaneously forming a seal around the drill string to seal off well-head pressure when an area of high pressure such as a high pressure gas pocket has been contacted.

There are many problems associated with conventional hydraulic fluids used in such applications. For example, the handling of many conventional hydraulic fluids may be complicated by their combustibility, i.e., low flash points, and poor fire resistance. Furthermore, many conventional hydraulic fluids are toxic and accidental spillage, especially into the ocean, creates significant problems. These materials therefore require special handling.

Many conventional hydraulic fluids are not suitable for such applications due to their low tolerance to sea water contamination or to contamination by hydrocarbons, i.e., they tend to readily form emulsions with small amounts of hydrocarbons. Furthermore, in marine environments, problems arise due to the lack of biodegradability of the hydraulic fluid and to bacterial infestations arising in the hydraulic fluid, especially from anaerobic bacteria such as the sulfate reducing bacteria prevalent in sea water.

Some conventional hydraulic fluids are substantially non-corrosion-resistant and may, in fact, cause corrosion with metals in contact with the fluid. Other conventional hydraulic fluids reactive with paints or other metal coatings or tend to react with elastomeric substances or at least cause swelling of the elastomeric substance.

Some conventional hydraulic fluids have poor long-term stability, especially at elevated temperatures and some require anti-oxidants to avoid the oxidation of contained components. Some hydraulic fluids are not easily concentrated for ease in shipping.

Other problems arising in applications such as blowout preventer hydraulic fluids include a tendency to produce significant amounts of suspended particulates and residues. Also, many hydraulic fluids have a non-neutral pH, thereby enhancing the opportunity for reaction with materials in contact with it.

SUMMARY OF THE INVENTION

The present invention provides an aqueous hydraulic fluid comprising at least one lubricating component containing an amino carboxylate zwitterion having an unbranched alkyl group containing from 10 to 30 carbon atoms attached to the amine nitrogen.

More particularly, the hydraulic fluid comprises a water solution of a compound having the formula

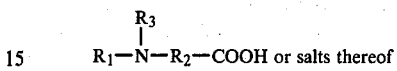

$$R_1-N(R_3)-R_2-COOH \text{ or salts thereof}$$

wherein $R_1$ comprises an unbranched alkyl group containing from 10 to 30 carbon atoms. $R_2$ comprises an alkyl group having a carbon chain containing from 1 to 3 carbon atoms between the nitrogen and the carboxylate carbon. $R_3$ is selected from the group consisting of polyethylene oxide groups having from 3 to 40 ethylene oxide units and polypropylene oxide groups having from 1 to 10 propylene oxide units. The working concentration of the compound in the hydraulic fluid is from about 0.01 percent to about 0.15 percent by volume.

In a preferred embodiment, the hydraulic fluid also comprises a compound having the formula

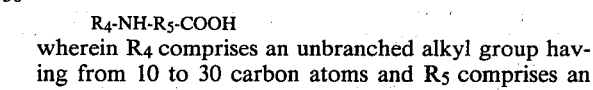

$$R_4\text{-NH-}R_5\text{-COOH}$$

wherein $R_4$ comprises an unbranched alkyl group having from 10 to 30 carbon atoms and $R_5$ comprises an alkyl group having a carbon chain containing from 1 to 3 carbon atoms between the nitrogen and the carboxylate carbon. The concentration of this is from about 0.01 percent to about 0.15 percent by volume. This compound enhances the lubricating properties of the hydraulic fluid as compared to hydraulic fluids containing only the first compound.

In a more preferred embodiment, the hydraulic fluid includes a compound having the formula

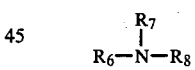

$$R_6-N(R_7)-R_8$$

wherein $R_6$ comprises an unbranched alkyl group containing from 10 to 30 carbon atoms, $R_7$ comprises a polyethylene oxide group containing from 3 to 40 ethylene oxide units and $R_8$ is selected from the group consisting of hydrogen and polyethylene oxides having from 3 to 40 ethylene oxide units. The preferred concentration of this compound is from about 0.005 percent to about 0.05 percent by volume.

A particularly preferred embodiment further comprises a biocide capable of at least preventing growth of bacteria in the hydraulic fluid and preferably capable of killing bacteria present in the hydraulic fluid. Preferred biocides comprise at least one compound selected from the group consisting of fatty acid quarternary ammonium salts having the cationic formula $$R_9\text{-N(CH}_3)_3$$

wherein $R_9$ is an unbranched alkyl group containing from 15 to 25 carbon atoms. Preferred alkyl groups are coco, tallo and soya. The presently preferred biocide is soya quaternary ammonium chloride present in a concentration of from about 0.01 percent to about 0.1 percent by volume.

The particularly preferred embodiment further comprises a corrosion inhibitor selected from the group consisting of polyethoxylated fatty amines and ethoxylated fatty diamines. The corrosion inhibitor is present in a concentration sufficient to substantially prevent corrosion of metals in contact with the hydraulic fluid, preferably in a concentration from about 0.01 percent to about 0.10 percent by volume. The polyethylene oxide group contains from 3 to 40 ethylene oxide units.

Preferably, the hydraulic fluid also includes a compound for reducing the freezing point of the hydraulic fluid. Preferred compounds include polyhydroxides having from 2 to 4 carbon atoms in a concentration sufficient to reduce the freezing point of the hydraulic fluid to below about $-30°$ F. The preferred polyhydroxide compounds include ethylene glycol, propylene glycol and 2-butene-1,4-diol. The presently preferred polyhydroxide compound is ethylene glycol in a concentration of from about 0.6 percent to about 1.4 percent by volume.

The hydraulic fluid of the particularly preferred embodiment also comprises a polyhydroxide compound capable of enhancing the dispersibility and solvation characteristics of the hydraulic fluid. Preferred compounds include polyhydroxides having from 2 to 6 carbon atoms. The presently preferred polyhydroxide compound is hexylene glycol in a concentration from about 0.04 percent to about 0.3 percent by volume.

The hydraulic fluid is capable of being prepared in a concentrated form up to the saturation point of the components. If a preferred biocide is incorporated in the hydraulic fluid, the concentrate may be prepared to require a dilution of up to 80 parts water for each part of concentrate to achieve a working solution.

DETAILED DESCRIPTION

A presently preferred embodiment of the hydraulic fluid of this invention comprises a combination of lubricating components, a biocide, a corrosion inhibitor, a freezing-point depressant and a dispersant.

One lubricating component comprises at least one compound selected from zwitterions having the formula

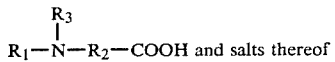

wherein $R_1$ comprises an unbranched alkyl group having from to 30 carbon atoms, preferably from 15 to 25 carbon atoms and more preferably from 18 to 22 carbon atoms, thereby forming a fatty amine with the amine nitrogen. Suitable salts include those of sodium and potassium.

As used herein, "fatty amine" refers to an alphatic amine having an unbranched alkyl group containing from to 30 carbon atoms.

$R_2$ comprises an alkyl group in which the number of carbon atoms between the nitrogen and the carboxylate carbon is from 1 to 3 and preferably from 1 to 2. $R_3$ is a functional group selected from the group consisting of a polyethylene oxide group and a polypropylene oxide group. In compounds having a polyethylene oxide group attached to the amine nitrogen, the polyethylene oxide group contains from 3 to 40 ethylene oxide units, and preferably from 10 to 15 ethylene oxide units. In compounds having a polypropylene oxide group attached to the amine nitrogen, the polypropylene oxide group contains from 1 to 10 propylene oxide units and preferably from 3 to 5 propylene oxide units.

The preferred compounds include the sodium and potassium salts of fatty amino polyethanoxy carboxylates wherein the fatty amine formed by the amine nitrogen and the $R_1$ group contains from 18 to 22 carbon atoms. The preferred compound is a steryl amino polyethanoxy carboxylate sold in an approximately 50 percent diluted form by Mazer Chemicals, Inc. of Gurnee, Ill., under the trade name Mafo-13.

The lubricant is present in a concentration of from about 0.01 percent by volume to about 0.1 percent by volume, preferably from about 0.04 percent by volume to about 0.08 percent by volume and more preferrably about 0.06 percent by volume.

Preferably the hydraulic fluid further comprises a second lubricating component having at least one compound selected from the group of zwitterions having a formula

wherein $R_1$, $R_2$ and $R_3$ are the same as described for compounds of the first lubricating component.

The zwitterion of the second lubricating component is present in a concentration of from about 0.005 percent to about 0.05 percent by volume, preferably from about 0.02 percent to about 0.04 percent and more preferably about 0.03 percent by volume.

The second lubricating component further comprises at least one polyethoxylated fatty amine having the formula

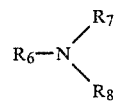

wherein $R_6$ comprises an unbranched alkyl group having from 10 to 30 carbon atoms, preferably from 15 to 25 carbon atoms and more preferably from 18 to 22 carbon atoms. $R_7$ comprises a polyethylene oxide group having from 3 to 40 ethylene oxide units and preferably from 10 to 15 ethylene units. $R_8$ may be either hydrogen or a second polyethylene oxide group containing from 3 to 40 ethylene oxide units and preferably from 10 to 15 ethylene oxide units. Preferred polyethoxylated fatty amines are tertiary amines comprising a fatty amine having two polyethylene oxide groups attached to the amine nitrogen.

The polyethoxylated fatty amine is present in a concentration of from about 0.005 percent by volume to about 0.05 percent by volume, preferably from about 0.02 percent by volume to about 0.04 percent by volume, and more preferably about 0.03 percent by volume.

The presently preferred second lubricating component is sold in an approximately 50 percent diluted form by Maser Chemical Co. under the trade name Mafo-13-Mod-1.

The preferred concentrations of the first and second lubricating components are interdependent if both are used. The total concentration of the first and second lubricating components is preferred to be from about 0.05 percent to about 0.15 percent by volume. Therefore, a concentration of one lubricating component at one end of its concentration range will preferably be compensated for, at least in part, by a concentration of the other component sufficient to bring the total concentration of both components within the preferred range.

The hydraulic fluid preferably further comprises a third lubricating component selected from the group of zwitterions having the formula $R_4$-NH-$R_5$-COOH and salts thereof wherein $R_4$ comprises an unbranched alkyl group having from 10 to 30 carbon atoms, preferably from 15 to 25 carbon atoms and more preferably from 18 to 22 carbon atoms, thereby forming a fatty amine. $R_5$ comprises an alkyl group having a carbon chain between the amine nitrogen and the carboxylate carbon containing from 1 to 3 and preferably from 1 to 2 carbon atoms. It is preferred that the carbon chain of $R_5$ between the nitrogen and the carboxylate carbon contain at least an alkyl substitution, preferably a methyl group attached to the carbon atom adjacent the nitrogen. Examples of preferred compounds include fatty amino carboxylates and salts thereof and the crotonic acid zwitterion from 1-(2-amino ethyl)-2-heptadecenylimidazoline. The presently preferred zwitterion is an N-coco-beta-amino butyric acid sold in an approximately 50 percent diluted form by Armak Industrial Chemical Company of Chicago, Ill., under the trade name Armeen-Z.

The concentration of the third lubricating component is from about 0.01 percent to about 0.1 percent by volume, preferably from about 0.03 percent to about 0.07 percent, and more preferably at about 0.04 percent by volume.

The preferred concentration of the third lubricating component depends on the total concentration of the first and second components. Preferably, the total concentration of the first, second and third lubricating components, if all these are used, is from about 0.1 percent to about 0.2 percent by volume. Therefore, a particularly high or low concentration of any one or possibly two components will be compensated for by a concomitant low or high concentration of the other components.

A particularly preferred embodiment comprises Mafo-13 and Mafo-13-Mod-1 which are both manufactured by Mazer Chemical Co. and Armeen-Z, manufactured by Armak Industrial Chemical Company.

The preferred embodiment exhibits excellent lubricating properties or wear-reduction properties at both low pressure or boundary conditions and extreme pressure conditions. The boundary properties are excellent. For example, as measured by Timken wear test (ASTM D-2509, D-2782) wherein the loss of weight of a test block in contact with a rotating ring in the presence of the hydraulic fluid under an applied torque is measured, the block loses less than 0.1 mg for every 10 in./lbs. of applied torque up to 40 in./lbs. of applied torque.

A further indication of the excellent boundary property is established by allowing the lubricant to stand in contact with the ring and test block several hours and re-running the Timken test in the boundary region of 60 to 600 foot pounds of applied torque. The hydraulic fluid does not cause galling or seizing.

Extreme pressure properties, i.e., properties at applied torques greater than 1800 foot pounds indicate that the hydraulic fluid can withstand at least 2000 foot pounds of applied torque before galling or seizing occurs.

As measured according to the Vicker vane pump test of ASTM D-2882-74 wherein the hydraulic fluid is circulated through a rotary vane pump for eight hours at 175° F. followed by 92 hours at 150° F. and 2000 psi, the hydraulic fluid lubricates sufficiently well to limit weight loss in the vanes to as little as 0.06 percent by weight. The weight loss of the rings is as low as 0.7 percent by weight.

The zwitterion compounds consist of a long hydrophobic end or tail and a polar hydrophillic end or head which are carefully selected to optimize the lubricating properties and detergency characteristics. While not being bound by theory, it is believed that the polar end of the zwitterions of the lubricating components is attracted to and wets the surface of the substrate material, i.e., the material such as metals contacting the hydraulic fluid. The polar group thus forms an anchor for the zwitterion and is therefore less easily displaced than substantially non-polar molecules. The long chain alkyl group attached to the amine nitrogen provides a substantially non-polar and thus substantially hydrophobic end which has a very low coefficient of friction, and therefore excellent lubricating properties.

The hydraulic fluid further comprises a biocidal agent or biocide. The biocide is compatible with the lubricating components, i.e., does not affect lubricating properties. The presently preferred biocide comprises at least one compound selected from fatty acid quaternary ammonium salts having the cation formula

wherein $R_9$ comprises an unbranched alkyl group derived from a fatty acid and has from 15 to 25 carbon atoms and preferably from 18 to 22 carbon atoms. The preferred alkyl groups include coco, i.e., alkyl groups derived from fatty acids found in coconut oil, tallo, i.e., alkyl groups derived from fatty acids found in tallo, and soya, i.e., alkyl groups derived from fatty acids found in soybean oil. The presently preferred biocide is the soya quaternary ammonium chloride salt.

The concentration of the biocide is sufficient to at least substantially prevent bacterial growth in the hydraulic fluid and preferably to kill the bacteria present The concentration of the preferred biocides is in a range of from about 0.01 percent to about 0.1 percent by volume. The soya quaternary ammonium salt is preferred because it kills substantially all anaerobic bacteria, including the sulfate reducing bacteria found in seawater, i.e., as disulfo-vibrio disulfuricans, and certain aerobic bacteria. The preferred concentration of the soya quaternary ammonium salt is from about 0.02 percent to about 0.07 percent by volume and more preferably about 0.05 percent by volume.

The hydraulic fluid further comprises a freezing-point depressant capable of lowering the freezing point of the hydraulic fluid to at least about −30° F. which is below the minimum temperature expected to be encountered in such environments. The freezing-point depressant is non-reactive with the lubricating components and biocide and is therefore not detrimental to the lubricating properties of the hydraulic fluid.

The freezing-point depressant comprises at least one polyhydroxy alcohol having from 2 to 4 carbon atoms in an amount sufficient to reduce the freezing point to below −30° F. Preferred polyhydroxy alcohols include ethylyene glycol, propylene glycol and 2-butene-1,4- diol. Ethylyene gycol is presently preferred in a concentration from about 0.6 percent to about 1.4 percent by volume, and preferably in a concentration of from about 0.8 percent to about 1.0 percent by volume.

The polyhydroxy alcohols having from 2 to 4 carbon atoms also enhance the dispersibility and solvation properties of hydraulic fluid. To further enhance the dispersibility and solvation properties of the hydraulic fluid, a second polyhydroxide compound having from 2 to 6 carbon atoms, preferably hexylene glycol, is added in a concentration from about 0.04 percent to about 0.3 percent by volume and preferably from about 0.1 percent to about 0.2 percent by volume.

The hydraulic fluid also contains a corrosion inhibitor to prevent corrosion and oxidation. Preferred corrosion inhibitors are water-soluble polyethoxylated fatty amines and polyethoxylated diamines. Particularly preferred corrosion inhibitors are polyethoxylated fatty diamines having the formula

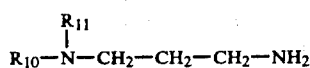

wherein $R_{10}$ comprises an alkyl group containing from 15 to 25 carbon atoms and preferably from 18 to 22 carbon atoms derived from a fatty acid and $R_{11}$ comprises a polyethylene oxide group having from 3 to 40 ethylene oxide units. The corrosion inhibitor is in a concentration sufficient so that substantially no corrosion occurs, i.e., corrosion, if present, results in a loss of less than 10 mils per year in the thickness of a metal in contact with the hydraulic fluid. The presently preferred polyethoxylated fatty diamine is Ethoduomeen T-25, sold by Armak Industrial Chemical Co. of Chicago, Ill. Typically concentrations range from about 0.01 percent to about 0.1 percent by volume and preferably from about 0.03 per cent to about 0.07 percent by volume.

Whereas the above-described embodiment is preferred for applications such as in hydraulic fluid for blowout preventers encountered in or with off-shore oil drilling rigs, other embodiments are suitable for many applications. For example, in a substantially corrosion-free environment, a corrosion inhibitor need not be included in the composition of the hydraulic fluid. Similarly, in an environment in which bacterial infestation is not a problem, the biocide may be omitted. For applications at warm or elevated temperatures, a freezing-point depressant is not required. Furthermore, enhanced dispersibility which is accomplished by the addition of an agent such as hexylene glycol may not be required.

The hydraulic fluid must, however, retain sufficient lubricating compounds to provide suitable lubricating properties under conditions expected to be encountered. While not presently preferred, compounds of the first lubricating component or compounds of the second lubricating component alone supply sufficient lubricating properties for many applications. The lubricating properties of a hydraulic fluid containing a compound from only one lubricating component may be enhanced by the addition of at least one compound from one other lubricating component. In other words, a combination of compounds from two lubricating components exhibit better lubricating properties as compared to compounds from a single lubricating component, from the compounds of the third lubricating component. Further enhancement of the lubricating properties is achieved by a combination of compounds from all three lubricating components as described above as the presently preferred embodiment.

In a particularly preferred embodiment, the hydraulic fluid is prepared as a concentrate which must be diluted with up to about 80 parts water for each part concentrate and preferably about 50 parts water to about 1 part concentrate to achieve the working concentrations.

In preparing the concentrate, the lubricating compounds are blended first with water. The amount of water must be sufficient to substantially prevent or at least minimize any reaction of the lubricating components with other subsequently added compounds due to the relatively high concentrations of all compounds present in the concentrate. The polyhydroxy compounds forming the freezing-point depressant and dispersant and the corrosion inhibitor are substantially non-reaction, even at high concentrations. However, the biocide is highly charged and may react with and possibly degrade at least a portion of the lubricating components if the lubricating components are not diluted before contact with the biocide or corrosion inhibitor.

Typically, the amount of water blended with the lubricating components will be about two-thirds of the water required to form such a concentrate. Blending is accomplished by any conventional method that does not cause excessive foaming, for example, such as mechanical propeller-type means. Blending is sufficient to form a substantially homogeneous mixture.

The freezing-point depressant, the dispersants and the corrosion inhibitor are then added, again blending by substantially non-foaming means to achieve a substantially homogeneous mixture. The biocide is then added after the lubricating components have been diluted by the water, the freezing-point depressant, the dispersant and the corrosion inhibitor to substantially prevent or at least minimize any reaction of the highly charged biocide with the lubricant. Remaining water, if any, is added to bring all the components into the desired concentration ranges.

Hydraulic fluids not containing the biocide may be prepared in a concentrated form up to about the saturation point of the mixture of components in the particular formulation.

Hydraulic fluids of the present invention have several striking advantages over conventional hydraulic fluids. For example, hydraulic fluids prepared in accordance with the present invention have a generally neutral pH ranging from about 6.0 to about 7.5. The generally neutral pH is beneficial in that substantially no reaction occurs with substances, such as metals, in contact with the hydraulic fluid due to the acidity or basicity of the hydraulic fluid.

The hydraulic fluids are non-flammable and non-combustible, i.e., have no flash point. Additionally, the hydraulic fluids are non-toxic and biodegradable. This facilitates handling of the hydraulic fluid by an operator working with the fluid.

The hydraulic fluid is easily concentrated into a form requiring a dilution of up to 80:1 parts water for each part of concentrate prior to use. The concentrated form can be stored for extended periods, even at elevated temperatures, i.e., temperatures up to about 250° F. for an indefinite time.

The diluted form is also stable for extended periods, even at elevated temperatures of up to about 210° F.

The hydraulic fluid is further stable towards oxidation and therefore requires the addition of no anti-oxidants.

The hydraulic fluid in the diluted working form has a very low viscosity of about 1.1 centistokes. It is therefore easy to pour and has excellent flow characteristics. The viscosity of the concentrated form is also very low. For example, a concentrate requiring a dilution of about 50 parts water for each part concentrate has a viscosity of only about 3.64 centistokes. Compared with most conventional hydraulic fluids, the viscosity of both the diluted and concentrated forms are low and thus possess favorable flow characteristics.

Hydraulic fluids of the present invention are also substantially non-reactive to paints and other metal coatings. Furthermore, the hydraulic fluids are substantially non-reactive to elastomeric substances and do not cause elastomeric substances to swell.

The hydraulic fluids exhibits tolerance to both sea water and hydrocarbon contamination without forming significant amounts of percipitates or forming an emulsion. The hydraulic fluids also provide effective wear resistance without the formation of a significant amount of particulate matter. The vane pump test previously described formed less than about 50 parts per million of particulates, and more than 60 percent of the particulates formed had a particle size less than 15 microns. The hydraulic fluids also form no significant residues.

EXAMPLE 1

Thirty gallons of an aqueous hydraulic fluid comprising about 0.1 percent Mafo-13, about 0.1 percent Mafo-13-Mod-1, both sold by Mazer Chemical Co., about 0.07 percent Armeen Z, sold by Armak Industrial Chemical Co., about 0.05 percent soya quaternary ammonium chloride, about 0.2 percent hexalene glycol and about 0.9 percent ethylene glycol was circulated through a rotary vane pump utilizing a Vickers 1046 type cartridge unit in accordance with ASTM D-2882-74.

The temperature was allowed to reach 175° F. for 8 hours and regulated to 150° F. (±5°) for the remaining 92 hours at 2000 psi. The test cartridge was removed and the loss in weight of the vanes was found to be 0.0155 grams which was less than 0.1 percent weight loss. The loss in weight of the rings was also recorded and found to be 1.750 grams corresponding to less than 1 percent weight loss.

A sample of the oil was also removed and carefully inspected for particulate matter. The total precipitated and suspended particulate matter was found to be 39 ppm. The particle size distribution was measured and is given as follows:

| Particle Size Range | Particle Counts (per 100 cc) |
|---|---|
| 5-14 microns | 1,360 |
| 15-24 microns | 360 |
| 25-49 microns | 180 |
| 50-99 microns | 60 |
| ≧ 100 microns | 0 |

EXAMPLE 2

The hydraulic fluid of Example 1 was compared to various commercially available hydraulic fluids with regard to a number of physical and chemical properties. The results are listed in Table I in which the exemplary fluid from Example 1 is identified as "Example 1".

The commercially available hydraulic fluids include: Quinto Lubic 822, a tensioner/compensator fluid sold by Quakerchem of Conshohocken, Pa.; Koomey K50, a concentrated hydraulic fluid of the amine type sold by Koomey, Inc. of Houston, Tex.; Cameron 590, a water-soluble hydraulic fluid comprising an amine adduct in an oxygenated solvent by Cameron, Inc. of Houston, Tex.; Ultraglide VHC, a blowout preventer and control fluid sold by Ultraglide, Ltd. of Angus, Scotland; Pydraul 29E, a phosphate ester type hydrulic fluid sold by Monsanto Co. of St. Louis, Mo.; Rig Right, a blowout preventer hydraulic fluid sold by Chesson Oil Co., Inc. of Lake Charles, La.; and VCF-72, a hydraulic fluid for a Vetco motion compensator system sold by Vetco Offshore, Inc. of Houston, Tex.

The chemical and physical properties listed in Table I were accumulated from available literature and testing methods which include the following tests:

Timken wear test (ASTM D-2509, D-2782) was conducted wherein a machined steel ring was mounted on the shaft of a DC motor and was rotated at constant speed. A test block of steel was mounted on a torquemeter graduated in inch or foot pounds. The block and ring were immersed in a vessel which contained the hydraulic fluid. The ring was rotated at constant speed and a given torque applied to the rotating ring for five minutes. The test was conducted until excessive wear, seizure or galling occured. The torque (in foot-pounds) at which galling or seizure occurred was recorded. The ring was changed in each media and a new inscription was made for each applied torque.

The Vickers vane (ASTM D-2882) test was conducted wherein approximately 30 to 45 gallons of the hydraulic fluid was circulated through a rotary vane pump which utilizes a Vickers 1046 type cartridge unit. The fluid was circulated for 100 hours at 2000 psi. The temperature was regulated to be in the range of about 150° F. to about 175° F. for the test period. The test cartridges were removed and the loss in weight of the vanes plus the ring was recorded.

Biocidal/bacteriostatic properties were determined according to the American Petroleum Institute Method wherein the hydraulic fluid was innoculated with a strain of sulfate reducing bacteria (desulfo vibrio desulfuricans) and allowing the innoculated fluid to culture in a nutrient broth. Serial dilutions of the broth were made to determine the biocidal and/or bacteriostatic properties of the lubricant composition. A ±designation indicates that the material has some bacteriostatic properties but no biocidal (kill) characteristics. A −designation indicates both biocidal and bacteriostatic properties, whereas a +designation indicates that the material is not effective as a biocide nor does it render the solution bacteriostatic.

The corrosion rate was determined by immersing a mild steel coupon weighing 22.75±0.2 grams in the particular hydraulic fluid for 30 days in a loosely-covered petri dish. The coupons were then washed, dried and weighed. The loss or increase in weight of the coupons was recorded as the change in weight (in milligrams) of the coupon.

To test for swelling of rubber, the Federal Trade Method 3603 was used wherein dimensional "O" rings of Viton E and Neoprene were measured with a micrometer and then immersed in the hydraulic fluid for 30 days at room temperature (75° F.). The rings were wiped free of lubricant and the "O" measurements again recorded to determine the degree of swelling.

Foam properties were measured by shaking 50 cc of the lubricant vigorously for 10 seconds in a graduated cylinder. The initial foam volume and foam volume after 10 minutes were recorded. If the foam volume was greater than 25 percent (12.5 cc) of the total volume of solution, the lubricant was judged as failing the test.

The reaction to paint was determined by contacting the hydraulic fluid with an oil-based, alkyl-type enamel paint for 30 days.

Tolerance to sea water was determined by mixing the hydraulic fluid with 1 percent by volume of a mixture of 25 percent sea water and 75 percent fresh water.

Properties such as specific gravity, viscosity, solubility in water, flash point, pH, fire resistances and pour points were measured by concentional techniques. ASTM or other known test methods were used where appropriate and are so designated in the table. For example, fire resistance was determined according to the military specification H-8382.

TABLE I

| | Performance Characteristics of Hydraulic Fluids | | | | | | | |
|---|---|---|---|---|---|---|---|---|
| | Quintolubic 882 | Koomey K-50 | Cameron 590 | Ultraglide VHC | Pydraul 29E | Rig Right | VCF-72 | Example 1 |
| Specific Gravity | .991 | 1.067 | 1.072 | 1.032 | 1.093 | 1.015 | 0.960 | 1.013 |
| Viscosity 100° F., cst. (D-434) | 190 | 2.83 | 3.78 | 15.8 | 30.9 | 2.51 | 39 | 3.64 |
| Solubility (H$_2$O) | insoluble | soluble | soluble | soluble | negligible | soluble | insoluble | soluble |
| Flash Point (D-92) | 500° F. | 265° F. | 358° F. | N/A | 485° F. | none | 345° F. | none |
| pH | 6.8 | 7.9 | 6.9 | 7.1 | 7.8 | 8.2 | 6.9 | 7.2 |
| Timken Wear (ft · lb) (D-2509, D-2782) | 3570 | 1090 | 2140 | 595 | 950 | 1140 | 980 | 3850 |
| Vickers Vane (total at loss, mg) | 236 | 54.4 | N/A | N/A | 45 | N/A | N/A | 17.5 |
| Corrosion Rate (30 day wt. loss, mg) | 1.3 | 2.5 | 0.02 | 0.01 | .02 | 0.04 | .01 | 0.005 |
| Biocidal/Bacteriostatic Properties, | ± | + | + | + | + | + | ± | — |
| Recommended Dilution Ratio | none | 50:1 | 100:1 | 54:1 | none | 50:1 | none | 50:1 |
| Reaction with Paint | slight | none | none | none | blisters | none | slight | none |
| Pour Point, °F. (D-97) | −15° F. | −40° F. | −45° F. | −40° F. | −35° F. | −30° F. | −85° F. | −58° F. |
| Swelling of Rubber (FTM-3603) | swells | nil | nil | nil | swells | slight | slight | none |
| Sea Water, Fresh Water (25/75) | separates | cloudy | clear | milky | separates | hazy | separates | slight |
| Fire Resistance Mil H-8382 | pass | pass | pass | pass | pass | pass-fail | pass | pass |
| Foam Properties | fail | fail | fail | fail | pass | fail | pass | pass |

N/A = not available

The preceding description has been presented with reference to the presently preferred compositions and methods of preparation of the invention. Workers skilled in the art and technology to which this invention pertains will appreciate that alterations and changes in the structural and procedural aspect of the described compositions and procedures can be practiced without meaningfully departing from the principles, spirit and scope of this invention. Acordingly, the foregoing description should not be read as pertaining only to the precise structures and procedures described, but rather should be read consistent with and as support for the following claims which are to have their fullest fair scope.

What is claimed is:

1. A hydraulic fluid capable of withstanding applied torques of at least 2000 foot pounds before galling or seizing as measured by the Timken test comprising an aqueous solution containing at least one zwitterion having a amine group separated from a carboxylate group by a carbon chain having from 1 to 3 carbon atoms, said zwitterion comprising an unbranched alkyl group having from 10 to 30 carbon atoms attached to the amine nitrogen.

2. A hydraulic fluid as claimed in claim 1 wherein at least a portion of the zwitterions contain a functional group selected from the group consisting of polyethylene groups containing from 3 to 40 ethylene oxide units and polypropylene oxide groups having from 1 to 10 propylene oxide units attached to the amine nitrogen.

3. A hydraulic fluid as claimed in claim 1 wherein at least a portion of the zwitterions contain at least one alkyl substitution on the carbon chain between the amino group and the carboxylate group.

4. A hydraulic fluid as claimed in claim 1 wherein the zwitterion is present in a concentration from about 0.01 percent to about 0.15 percent by volume.

5. A hydraulic fluid as claimed in claim 1 further comprising at least one polyethoxylated fatty amine containing an unbranched alkyl group having from 10 to 30 carbon atoms and a polyethylene oxide group containing from 3 to 40 ethylene oxide units.

6. A hydraulic fluid comprising:
   a. at least one first compound selected from compounds having the formula

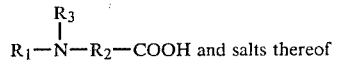

R$_1$—N—R$_2$—COOH and salts thereof with R$_3$ above N wherein R$_1$ comprises an unbranched alkyl group containing from 15 to 25 carbon atoms, R$_2$ comprises an alkyl group having a carbon chain containing from 1 to 3 carbon atoms between the nitrogen and the carboxylate carbon and R$_3$ is selected from the group consisting of polyethylene oxide groups containing from 3 to 40 ethylene oxide units and polypropylene oxide groups containing from 1 to 10 propylene oxide units; and b. at least one second compound selected from compounds having the formula R$_4$-NH-R$_5$-COOH and salts thereof wherein R$_4$ comprises an unbranched alkyl group having from 15 to 25 carbon atoms and R$_5$ comprises an alkyl group having from 1 to 3 carbon atoms between the nitrogen and the carboxylate carbon.

7. A hydraulic fluid as claimed in claim 6 wherein R$_1$ and R$_4$ comprises an unbranched alkyl group containing from 18 to 22 carbon atoms.

8. A hydraulic fluid as claimed in claim 6 wherein either or both of R$_2$ and R$_5$ comprises an alkyl group having a carbon chain containing from 1 to 2 carbon atoms between the nitrogen and carboxylate carbon.

9. A hydraulic fluid as claimed in claim 6 wherein R$_5$ contains at least one alkyl substitution on the carbon chain between the nitrogen and carboxylate carbon.

10. A hydraulic fluid as claimed in claim 6 wherein the first compound and the second compound are each present in a concentration of from about 0.01 percent to about 0.15 percent by volume.

11. A hydraulic fluid as claimed in claim 6 further comprising a polyethoxylated fatty amine having the formula

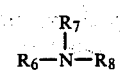

wherein R$_6$ comprises an unbranched alkyl group containing from 15 to 25 carbon atoms, R$_7$ comprises a polyethylene oxide group containing from 3 to 40 ethylene oxide units and R$_8$ is selected from the group consisting of hydrogen and polyethylene oxide groups having from 3 to 40 ethylene oxide units.

12. A hydraulic fluid as claimed in claim 11 wherein the polyethoxylated fatty amine is present in a concentration of about 0.005 percent to about 0.05 percent by volume.

13. A hydraulic fluid comprising:
   a. at least one first compound selected from compounds having the formula

wherein R$_1$ comprises an unbranched alkyl group containing from 15 to 25 carbon atoms, R$_2$ comprises an alkyl group having a carbon chain containing from 1 to 3 carbon atoms between the nitrogen and carboxylate carbon and R$_3$ is selected from the group consisting of polyethylene oxide groups having from 3 to 40 ethylene oxide units and polypropylene groups having from 1 to 10 propylene oxide units, said first compound being in a concentration of from about 0.01 percent to about 0.15 percent by volume;
   b. at least one second compound selected from compounds having the formula R$_4$-NH-R$_5$-COOH and salts thereof wherein R$_4$ comprises an unbranched alkyl group having from between 15 to 25 carbon atoms and R$_5$ comprises an alkyl group having a carbon chain containing from 1 to 3 carbon atoms between the nitrogen and the carboxylate carbon, said second compound being in a concentration of from about 0.01 percent to about 0.15 percent by volume; and c. at least one third compound selected from compounds having the formula

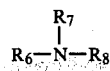

wherein R$_6$ comprises an unbranched alkyl group containing from 15 to 25 carbon atoms, R$_7$ comprises a polyethylene oxide group containing from 3 to 40 ethylene oxide units and R$_8$ is selected from the group consisting of hydrogen and polyethylene oxide groups having from 3 to 40 ethylene oxide units, in a concentration from about 0.005 percent to about 0.05 percent by volume.

14. A hydraulic fluid as claimed in claim 13 wherein any or all of R$_1$, R$_4$ and R$_6$ comprise an unbranched alkyl group containing from 18 to 22 carbon atoms.

15. A hydraulic fluid as claimed in claim 13 wherein R$_3$ is selected from the group consisting of polyethylene oxide groups containing from 10 to 15 ethylene oxide units and polypropylene oxide groups containing from 3 to 5 propylene oxide units.

16. A hydraulic fluid as claimed in claim 13 wherein either or both of R$_2$ and R$_5$ comprise an alkyl group having a carbon chain containing from 1 to 2 carbon atoms between the nitrogen and carboxylate carbon.

17. A hydraulic fluid as claimed in claim 13 wherein the first compound is present in a concentration of about 0.05 percent to about 0.10 percent by volume.

18. A hydraulic fluid as claimed in claim 13 wherein the second compound is present in a concentration of about 0.03 percent to about 0.07 percent by volume.

19. A hydraulic fluid as claimed in claim 13 where the third compound is present in a concentration of about 0.015 percent to about 0.035 percent by volume.

20. A hydraulic fluid as claimed in claim 13 further comprising a biocide capable of preventing the growth of bacteria in the hydraulic fluid.

21. A hydraulic fluid as claimed in claim 20 wherein the biocide comprises at least one compound selected from the group consisting of fatty acid quaternary ammonium salts having a cation formula

wherein R$_9$ comprises an unbranched alkyl group containing from 15 to 25 carbon atoms.

22. A hydraulic fluid as claimed in claim 13 further comprising a freezing-point depressant containing at least one polyhydroxide compound having from 2 to 4 carbon atoms in a concentration sufficient to reduce the freezing point of the hydraulic fluid to below −30° F.

23. A hydraulic fluid as claimed in claim 22 wherein the polyhydroxide compound is selected from the group consisting of ethylene glycol, propylene glycol and 2-butene-1,4-diol.

24. A hydraulic fluid as claimed in claim 22 wherein the polyhydroxide compound is present in a concentration from about 0.6 percent to about 1.4 percent by volume.

25. A hydraulic fluid as claimed in claim 13 further comprising a polyhydroxide compound having from 2 to 6 carbon atoms in a concentration from about 0.04 percent to about 0.3 percent by volume.

26. A hydraulic fluid comprising:
   a. at least one first compound selected from compounds having the formula

and salts thereof wherein $R_1$ comprises an unbranched alkyl group containing from 18 to 22 carbon atoms, $R_2$ comprises an alkyl group having a carbon chain containing from 1 to 3 carbon atoms between the nitrogen and carboxylate carbon and $R_3$ is selected from the group consisting of polyethylene oxide groups having from 3 to 40 ethylene oxide units and polypropylene groups having from 1 to 10 propylene oxide units, said first compound being in a concentration of from about 0.01 percent to about 0.15 percent by volume;

b. at least one second compound selected from compounds having the formula $R_4$-NH-$R_5$-COOH and salts thereof wherein $R_4$ comprises an unbranched alkyl group having from between 18 to 22 carbon atoms and $R_5$ comprises an alkyl group having a carbon chain containing from 1 to 3 carbon atoms between the nitrogen and the carboxylate carbon, said second compound being in a concentration of from about 0.01 percent to about 0.15 percent by volume;

c. at least one third compound selected from compounds having the formula

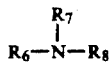

wherein $R_6$ comprises an unbranched alkyl group containing from 18 to 22 carbon atoms, $R_7$ is a polyethylene oxide group containing from 3 to 40 ethylene oxide units and $R_8$ is selected from the group consisting of hydrogen and polyethylene oxide groups having from 3 to 40 ethylene oxide units, said third compound being in a concentration from about 0.005 percent to about 0.05 percent by volume;

d. a biocide comprising at least one compound selected from the group consisting of fatty acid quaternary ammonium salts having a cation formula $R_9$-N(CH$_3$)$_3{}^+$ wherein $R_9$ comprises an unbranched alkyl group containing from 18 to 22 carbon atoms, said biocide being in a concentration of from about 0.01 percent to about 0.1 percent by volume;

e. a corrosion inhibitor selected from the group consisting of polyethoxylated fatty amines containing a polyethylene oxide group having from 3 to 40 ethylene oxide units and polyethoxylated fatty diamines containing a polyethylene oxide group having from 3 to 40 ethylene oxide units in an amount sufficient to substantially prevent corrosion of metal in contact with the hydraulic fluid; and f. a freezing-point depressant comprising at least one polyhydroxide compound having from 2 to 4 carbon atoms in a concentration sufficient to reduce the freezing point of the hydraulic fluid to below −30° F.

27. A hydraulic fluid as claimed in claim 26 wherein $R_9$ is selected from the group consisting of coco, tallo and soya.

28. A hydraulic fluid as claimed in claim 26 wherein the biocide is soya quaternary ammonium chloride.

29. A hydraulic fluid as claimed in claim 26 wherein the corrosion inhibitor is a polyethoxylated fatty diamine.

30. A hydraulic fluid as claimed in claim 26 wherein the corrosion inhibitor is present in a concentration of from about 0.01 percent to about 0.1 percent by volume.

31. A hydraulic fluid as claimed in claim 26 wherein the freezing-point depressant comprises ethylene glycol.

32. A hydraulic fluid as claimed in claim 31 wherein the concentration of ethylene glycol is from about 0.6 percent to about 1.4 percent by volume.

33. A hydraulic fluid as claimed in claim 26 further comprising hexylene glycol in a concentration of from about 0.04 percent to about 0.3 percent by volume.

34. A hydraulic fluid concentrate capable of being diluted with water in an amount of up to 80 parts water for each part concentrate to thereby yield a working hydraulic fluid as described in claim 26.

35. A process for the preparation of a hydraulic fluid concentrate as described in claim 34 comprising:
a. blending the first, second and third compounds with sufficient water to substantially prevent reaction of the first, second or third compounds with a subsequently added component wherein blending is performed by a substantially non-foaming means for a time sufficient to achieve a substantially homogeneous first mixture;
b. adding to the mixture the freezing-point depressant and the corrosion inhibitor and blending the mixture to thereby form a second substantially homogeneous mixture;
c. adding the biocide to the second mixture and blending the mixture to thereby form a substantially homegeneous third mixture; and
d. adding sufficient water to the third mixture and blending the mixture to provide a concentrate requiring a select dilution of up to 80 parts water for each part concentrate to achieve a working hydraulic fluid.

36. In a process for transmitting power from a power source to a load through the use of a hydraulic fluid, the improvement comprising using as the hydraulic fluid an aqueous solution containing at least one zwitterion having an amine group separated from a carboxylate group by a carbon chain having at least one carbon atom, said zwitterion comprising an unbranched alkyl group having from 10 to 30 carbon atoms attached to the amine nitrogen.

37. The process as claimed in claim 36 wherein at least a portion of the zwitterions contain a functional group selected from the group consisting of polyethylene groups containing from 3 to 40 ethylene oxide units and polypropylene oxide groups having from 1 to 10 propylene oxide units attached to the amine nitrogen.

38. The process as claimed in claim 36 wherein at least a portion of the zwitterions contain at least one alkyl substitution on the carbon chain between the amino group and the carboxylate group.

39. The process as claimed in claim 36 wherein the zwitterion is present in the hydraulic fluid in a concentration from about 0.01 percent to about 0.15 percent by volume.

40. The process as claimed in claim 36 wherein the hydraulic fluid further comprises at least one polyethoxylated fatty amine containing an unbranched alkyl group having from 10 to 30 carbon atoms and a polyethylene oxide group containing from 3 to 40 ethylene oxide units.

41. In a process for transmitting power from a power source to a load through the use of a hydraulic fluid, the improvement comprising using as the hydraulic fluid an aqueous solution comprising:
   a. at least one first compound selected from compounds having the formula $$R_1-\underset{\underset{R_3}{|}}{N}-R_2-COOH \text{ and salts thereof}$$

wherein $R_1$ comprises an unbranced alkyle group containing from 15 to 25 carbon atoms, $R_2$ comprises an alkyl group having a carbon chain containing at least 1 atom between the nitrogen and the carboxylate carbon and $R_3$ is selected from the group consisting of polyethylene oxide groups containing from 3 to 40 ethylene oxide units and polypropylene oxide groups containing from 1 to 10 propylene oxide units; and
   b. at least one second compound selected from compounds having the formula $$R_4\text{-NH-}R_5\text{-COOH and salts thereof}$$

wherein $R_4$ comprises an unbranched alkyl group having from 15 to 25 carbon atoms and $R_5$ comprises an alkyl group having at least 1 carbon atom between the nitrogen and the carboxylate carbon.

42. In a process for transmitting power from a power source to a load through the use of a hydraulic fluid, the improvement comprising using as the hydraulic fluid an aqueous solution comprising:
   a. at least one first compound selected from compounds having the formula $$R_1-\underset{\underset{R_3}{|}}{N}-R_2-COOH \text{ and salts thereof}$$

wherein $R_1$ comprises an unbranched alkyl group containing from 15 to 25 carbon atoms, $R_2$ comprises an alkyl group having a carbon chain containing from 1 to 3 carbon atoms between the nitrogen and carboxylate carbon and $R_3$ is selected from the group consisting of polyethylene oxide groups having from 3 to 40 ethylene oxide units and polypropylene groups having from 1 to 10 propylene oxide units, said first compound being in a concentration of from about 0.01 percent to about 0.15 percent by volume;
   b. at least one second compound selected from compounds having the formula $$R_4\text{-NH-}R_5\text{-COOH and salts thereof}$$

wherein $R_4$ comprises an unbranched alkyl group having from between 15 to 25 carbon atoms and $R_5$ comprises an alkyl group having a carbon chain containing from 1 to 3 carbon atoms between the nitrogen and the carboxylate carbon, said second compound being in a concentration of from about 0.01 percent to about 0.15 percent by volume; and
   c. at least one third compound selected from compounds having the formula $$R_6-\underset{\underset{R_7}{|}}{N}-R_8$$

wherein $R_6$ comprises an unbranched alkyl group containing from 15 to 25 carbon atons, $R_7$ comprises a polyethylene oxide group containing from 3 to 40 ethylene oxide units and $R_8$ is selected from the group consisting of hydrogen and polyethylene oxide groups having from 3 to 40 ethylene oxide units, in a concentration from about 0.005 percent to about 0.05 percent by volume.

43. In a process for transmitting power from a power source to a load through the use of a hydraulic fluid, the improvement comprising using as the hydraulic fluid an aqueous solution comprising:
   a. at least one first compound selected from compounds having the formula $$R_1-\underset{\underset{R_3}{|}}{N}-R_2-COOH \text{ and salts thereof}$$

wherein $R_1$ comprises an unbranched alkyl group containing from 18 to 22 carbon atoms, $R_2$ comprises an alkyl group having a carbon chain containing from 1 to 3 carbon atoms between the nitrogen and carboxylate carbon and $R_3$ is selected from the group consisting of polyethylene oxide groups having from 3 to 40 ethylene oxide units and polypropylene groups having from 1 to 10 propylene oxide units, said first compound being in a concentration of from about 0.01 percent to about 0.15 percent by volume;
   b. at least one second compound selected from compounds having the formula $R_4$-NH-$R_5$-COOH and salts thereof
wherein $R_4$ comprises an unbranched alkyl group having from between 18 to 22 carbon atoms and $R_5$ comprises an alkyl group having a carbon chain containing from 1 to 3 carbon atoms between the nitrogen and the carboxylate carbon, said second compound being in a concentration of from about 0.01 percent to about 0.15 percent by volume;
   c. at least one third compound selected from compounds having the formula $$R_6-\underset{\underset{R_7}{|}}{N}-R_8$$

wherein $R_6$ comprises an unbranched alkyl group containing from 18 to 22 carbon atoms, $R_7$ is a polyethylene oxide group containing from 3 to 40 ethylene oxide units and $R_8$ is selected from the group consisting of hydrogen and polyethylene oxide groups having from 3 to 40 ethylene oxide units, said third compound being in a concentration from about 0.005 percent to about 0.05 percent by volume;
   d. a biocide comprising at least one compound selected from the group consisting of fatty acid quaternary ammonium salts having a cation formula $$R_9\text{-N(CH}_3)_3{}^+$$

wherein $R_9$ comprises an unbranched alkyl group containing from 18 to 22 carbon atoms, said biocide being in a concentration of from about 0.01 percent to about 0.1 percent by volume;
   e. a corrosion inhibitor selected from the group consisting of polyethoxylated fatty amines containing a polyethylene oxide group having from 3 to 40 ethylene oxide units and polyethoxalated fatty diamines containing a polyethylene oxide group having from 3 to 40 ethylene oxide units in an amount sufficient to substantially prevent corrosion of metal in contact with the hydraulic fluid; and
   f. a freezing-point depressant comprising at least one polyhydroxide compound having from 2 to 4 carbon atoms in a concentration sufficient to reduce the freezing point of the hydraulic fluid to below $-30°$ F.

* * * * *